(12) United States Patent  
Rohden

(10) Patent No.: US 9,205,903 B2
(45) Date of Patent: Dec. 8, 2015

(54) SHIP WITH AT LEAST ONE SAIL ROTOR AND ADJUSTABLE PANEL AT THE BOW

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 348 days.

(21) Appl. No.: 13/639,842

(22) PCT Filed: Mar. 18, 2011

(86) PCT No.: PCT/EP2011/054136
§ 371 (c)(1),
(2), (4) Date: May 7, 2013

(87) PCT Pub. No.: WO2011/124460
PCT Pub. Date: Oct. 13, 2011

(65) Prior Publication Data
US 2013/0213286 A1 Aug. 22, 2013

(30) Foreign Application Priority Data

Apr. 6, 2010 (DE) .......................... 10 2010 003 662

(51) Int. Cl.
B63B 35/00 (2006.01)
B63H 9/02 (2006.01)
B63H 13/00 (2006.01)
B63B 39/06 (2006.01)
B63B 13/00 (2006.01)

(52) U.S. Cl.
CPC *B63H 9/02* (2013.01); *B63B 13/00* (2013.01); *B63B 39/06* (2013.01); *Y02T 70/58* (2013.01)

(58) Field of Classification Search
CPC .......... B63H 9/02; B63H 13/00; Y02T 70/58; Y02T 70/5236; Y02E 10/74; F03D 9/00
USPC .............................................. 440/8; 114/39.3
See application file for complete search history.

(56) References Cited

U.S. PATENT DOCUMENTS

| 1,674,169 A | 6/1928 | Flettner |
| 2,141,181 A | 12/1938 | Geddes |
| 2,151,836 A | 3/1939 | Bugatti |
| 2,584,347 A | 2/1952 | Hazard |
| 2,713,392 A | 7/1955 | Von Karman et al. |
| 3,004,510 A | 10/1961 | Nawara |
| 3,280,777 A | 10/1966 | Matzer |

(Continued)

FOREIGN PATENT DOCUMENTS

| BE | 895.044 A1 | 3/1983 |
| CH | 116268 A | 8/1926 |

(Continued)

OTHER PUBLICATIONS

Shipbuilding, "Rotosail to enter commercial service on 445 dwt ship," Schiff & Hafen, No. 7, XP-002079444, Hamburg, Deutschland, Jul. 1985, 2 pages.

(Continued)

*Primary Examiner* — Anthony Wiest
(74) *Attorney, Agent, or Firm* — Seed IP Law Group PLLC

(57) ABSTRACT

The invention relates to a ship, in particular a ship comprising at least one sail rotor. According to the invention, the ship has a front part that has a height-adjustable and/or pivotable panel.

15 Claims, 10 Drawing Sheets

(56) References Cited

U.S. PATENT DOCUMENTS

| | | |
|---|---|---|
| 3,428,194 A | 2/1969 | Weiss |
| 3,616,776 A | 11/1971 | Anker-Nilsen |
| 3,808,998 A | 5/1974 | Molotzak |
| 3,934,530 A * | 1/1976 | Kossa et al. ............... 114/260 |
| 4,377,123 A | 3/1983 | Jackson |
| 4,398,895 A | 8/1983 | Asker |
| 4,492,310 A | 1/1985 | Weingart |
| 4,602,584 A | 7/1986 | North et al. |
| 4,760,702 A | 8/1988 | Ammann et al. |
| 4,776,294 A | 10/1988 | Childs |
| 4,795,312 A | 1/1989 | Purcaru |
| 4,870,558 A | 9/1989 | Luce |
| 5,599,215 A | 2/1997 | Järvinen |
| 5,616,056 A | 4/1997 | Meissner |
| 5,724,906 A * | 3/1998 | Lee ............................. 114/71 |
| 6,302,652 B1 | 10/2001 | Roberts |
| 6,352,408 B1 | 3/2002 | Kilian |
| 6,644,926 B1 | 11/2003 | Vandyke |
| 6,792,886 B1 * | 9/2004 | Maloney et al. ............... 114/60 |
| 6,848,382 B1 | 2/2005 | Bekker |
| 8,070,446 B2 | 12/2011 | Potter et al. |
| 8,261,681 B2 | 9/2012 | Wobben |
| 8,601,964 B2 | 12/2013 | Rohden |
| 2003/0118446 A1 | 6/2003 | Han et al. |
| 2007/0163484 A1 * | 7/2007 | Eng et al. ..................... 114/362 |
| 2014/0137781 A1 | 5/2014 | Rohden |

FOREIGN PATENT DOCUMENTS

| | | |
|---|---|---|
| CN | 87 1 00987 A | 10/1987 |
| CN | 87 2 09395 U | 2/1988 |
| DE | 420840 C | 11/1925 |
| DE | 422057 C | 11/1925 |
| DE | 24 30 630 A1 | 4/1976 |
| DE | 3425426 A1 | 1/1986 |
| DE | 243 251 A | 2/1987 |
| DE | 41 01 238 A1 | 7/1992 |
| DE | 199 52 460 A1 | 5/2001 |
| DE | 101 02 740 A1 | 8/2002 |
| GB | 2 072 112 A | 9/1981 |
| GB | 2 111 007 A | 6/1983 |
| JP | 50-155789 U | 12/1975 |
| JP | 54-102786 U | 8/1979 |
| JP | 57-18596 A | 1/1982 |
| JP | 57-33082 A | 2/1982 |
| JP | 57-55292 A | 4/1982 |
| JP | 58-4696 A | 1/1983 |
| JP | 58-87698 U | 6/1983 |
| JP | 59-140193 A | 8/1984 |
| JP | 59-206296 A | 11/1984 |
| JP | 60-38290 A | 2/1985 |
| JP | 60-75193 U | 5/1985 |
| JP | 60-95398 U | 6/1985 |
| JP | 60-139593 A | 7/1985 |
| JP | 61-113090 U | 7/1986 |
| JP | 61-169796 U | 10/1986 |
| JP | 62-129387 U | 8/1987 |
| JP | 62-231889 A | 10/1987 |
| JP | 63-98899 U | 6/1988 |
| JP | 63-195998 U | 12/1988 |
| JP | 4331694 A | 11/1992 |
| JP | 5-213271 A | 8/1993 |
| JP | 8-26186 A | 1/1996 |
| JP | 8-74602 A | 3/1996 |
| JP | 2000-262082 A | 9/2000 |
| JP | 2001-30979 A | 2/2001 |
| JP | 2003-138836 A | 5/2003 |
| JP | 2005-132314 A | 5/2005 |
| KR | 10-1993-0004152 A | 3/1993 |
| KR | 97-010829 B1 | 7/1997 |
| KR | 10-2011-0063531 A | 6/2011 |
| RU | 2 063 362 C1 | 7/1996 |
| WO | 2006133950 A2 | 12/2006 |
| WO | 2011/124460 A1 | 10/2011 |

OTHER PUBLICATIONS

"Hybrid rotors for wind propulsion," *Marine Engineers Review* 604:54-55, London, Great Britain, Sep. 1991.

Beverley, "Electric Propulsion Drives," *Marine Engineering*:303-305, The Society of Naval Architects and Marine Engineers, Jersey City, New Jersey, Oct. 1, 1991.

Wagner, "Die Segelmaschine," *Ernst Kabel Verlag GmbH*:154-175, Hamburg, 1991.

International Search Report dated Jul. 12, 2011 from PCT/EP2011/054136 (6 pages).

* cited by examiner

SHIP WITH AT LEAST ONE SAIL ROTOR AND ADJUSTABLE PANEL AT THE BOW

BACKGROUND

1. Technical Field

The invention relates to a ship, especially a ship with at least one sail rotor.

2. Description of the Related Art

A sail rotor is a rotating cylinder, which is positioned on a ship and driven by a motor, preferably an electric motor and thereby creates forward thrust in connection with the wind sweeping by. The physics of the sail rotors were already described by the physician Magnus and ships with such sail rotors, also called Magnus rotors existed previously, which were successfully tested in the twenties by Anton Flettner. However, this technology, for example known from DE 420840 and CH 116268, lost its importance due to the introduction of diesel motors.

BRIEF SUMMARY

The present invention deals with the further development of a ship with at least one sail rotor, preferably four sail rotors, and in some cases it is an object of the invention not only to decidedly lower, with the sail rotor technology, the fuel consumption of a ship and thereby also the pollutant emission of the ship per transported ton compared to conventional shipping, but also to enable a safe operation of the ship, especially when the ship is a large freighter with a length of about 130 meters and the ship itself is ocean going.

The ship in accordance with aspects of the invention thereby comes not only with at least one sail rotor, but also with a marine screw (propeller) drive system which is driven by an electric motor. The electric motor can thereby be an electric machine which is also known as a generator of the type E-82 of the company Enercon, for example, is however operated as a motor and thereby also controlled by the power converters which are usually used in wind energy installations.

DETAILED DESCRIPTION

Figure 1:
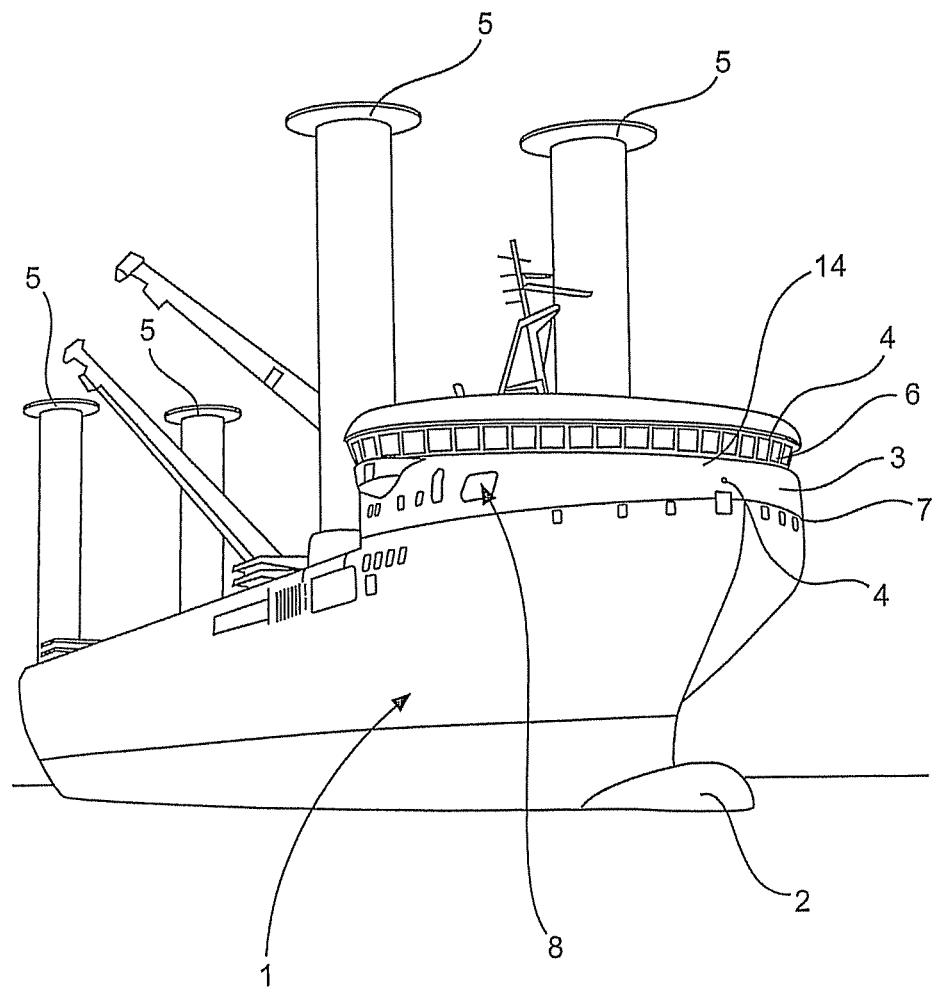
FIG. 1 is a schematic front right isometric illustration of a ship in accordance with aspects of the invention.

It is an object of the invention to further develop the ship known from WO 2006/133950 A2 so that waves which reach the forecastle are broken so that the ship becomes ocean going.

In accordance with an embodiment of the invention, the forecastle has a panel, which is pivotable relative to horizontal so that when strong seas and therefore strong waves are observed, the panel can be pivoted downward and waves which strike the forecastle can then be broken so that the thereby invading water can drain to the side without penetrating the ship.

The panel, which is pivotable at the forecastle relative to horizontal, has an upper position and a lower position. The lower position is assumed when high seas are observed and a wave breaker function is desired. The upper position is assumed when this is not the case and instead the incoming wind is to be guided as much as possible without turbulence to the upper deck of the ship to then drive the sail rotors as much as possible without swirling and thereby as much as possible without turbulence, in order to provide a maximum Magnus forward thrust or a stabilization by way of the Magnus rotors.

Thus, when the panel is in its upper position, it is used to guide the oncoming wind as optimal as possible to the Magnus rotors.

When the seas are too strong, the panel is pivoted downward in order to allow for the wave breaker function.

The invention is further described in the following by way of one of the exemplary embodiments illustrated in the drawings.

FIG. 1 shows a ship 1 in accordance with the invention with four sail rotors, also called Magnus or Flettner rotors. FIG. 1 thereby shows the ship especially from the bow end, with a bulbous bow 2 and the forecastle 3 positioned thereabove. The forecastle thereby extends without gapping to the bridge 4 of the ship 1, behind which the four sail rotors 5 are located.

As is apparent from FIG. 1, the forecastle 3 not only has gentle curves which are to prevent that the oncoming wind is too strongly swirled, but flows the wind as evenly as possible and laminar onto the sail rotors. The forecastle 3 also rises up to just below the windows 6 of the bridge 4.

Figure 7:
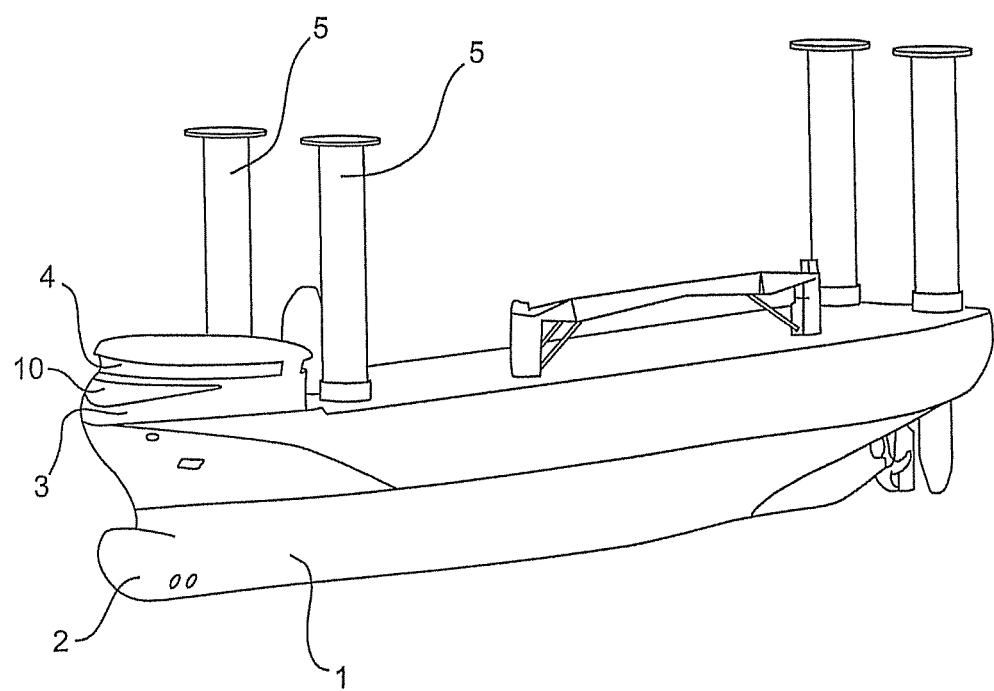
FIG. 7 is a simplified side view illustration of the ship in FIG. 1.

As is easily seen from FIG. 1 or FIG. 7, the height of the forecastle increases from the tip of the bow to the bridge (this is especially well recognized from the width of the white region between the black and white bowline 7 and the line of the windows 4). Furthermore, an opening 8 is provided in the forecastle region which can also be selectively closed on demand. The significance of this opening 8 is described further in the following.

As is apparent from FIG. 1, the width of the forecastle 3 increases from the tip of the bow (where the forecastle is smallest) to the bridge.

Because of the soft transitions at the tip of the bow as well as across the forecastle 3, across the bridge 4, the bridge roof as well as the sidewalls of the bridge and the sidewalls of the forecastle, the on flowing wind can reach the sail rotors 5 by way of the forecastle and the bridge and as much as possible without turbulence. It is thereby also noted that the forecastle 3 gradually rises from the tip of the bow 9 to the windows 6 of the bridge 4 so that the air in this region reaches the bridge or the windows and flows around the bridge by way of the bridge roof or along the windows (left or right) so that the air or the wind reaches the sail rotors 5 in order to contribute thereon to the forward thrust increase.

Figure 2A:
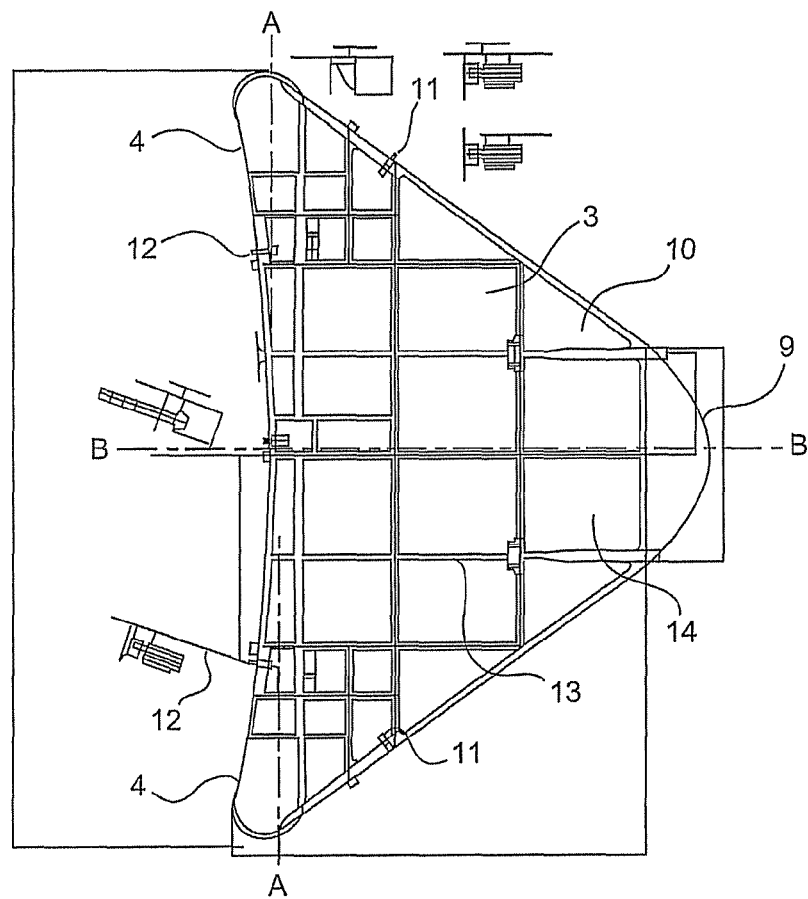
FIG. 2a is a top view of the forecastle in FIG. 1.

FIG. 2*a* shows a top view of the forecastle 3. The forecastle 3 has one-approximately triangular panel 10 which ends in its forward region in the region of the tip of the bow 9 and in the rearward region rests against the construction of the bridge 4.

Different locking mechanisms of the panel 10 are also apparent from FIG. 2*a*, whereby locking mechanisms 11 are provided on the side as well as the locking mechanisms 12 towards the bridge. The rectangular grids 13 are reinforcements of the panel 10 which are positioned below the surface 14 of the panel.

Figure 2B:
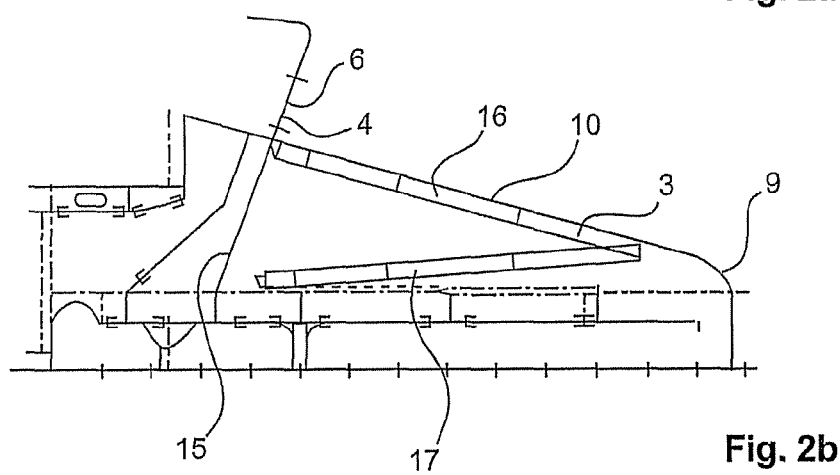
FIG. 2b is a cross section view of the forecastle in FIG. 2a along line B-B.

FIG. 2*b* shows a cross-section along line B-B through FIG. 2*a*. The panel 10 of the forecastle 3 and the transition to the bow or the tip of the bow 9 is thereby apparent as well as the abutment of panel 10 on the bridge 4 below the window 6 of the bridge 4 on the other hand. It is also apparent from FIG. 2*b* that the bridge itself has an under structure 15, whereby this under structure includes a solid steel shipwall in order to carry the weight of the bridge and to absorb forces acting transverse to the wall.

It is also illustrated in FIG. 2*b* that the panel 10 is displaceable through an upper position 16 as well as a lower position 17.

Figure 2C:
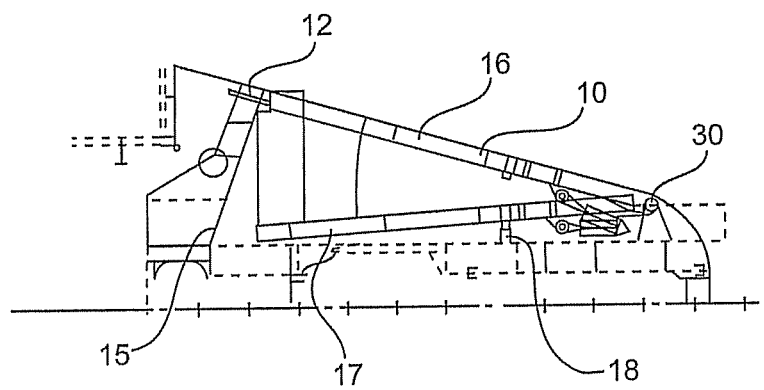
FIG. 2c is a cross section view of the forecastle in FIG. 2a along line B-B with hydraulic assemblies.

FIG. 2*c* shows mechanisms provided herefor, for pivoting of the panel 10 to the two positions 16, 17, namely essentially hydraulic assemblies for the lifting or lowering of the panel 10, in clear illustration. It is also apparent from FIG. 2*c* that the panel in the upper position is locked with the bridge wall of the under structure 15 through a locking mechanism 12.

The drive for the lifting and lowering of the panel includes a hydraulic piston or stamp supported in a cylinder, which—after opening of the locks 12 and 11—and when the lever length is shortened, lowers the panel about a joint 30 until it comes to rest on a rest 18 and/or the floor.

When the panel is in the lower position 17, it is there again locked at the side of the panel by locks 11.

Figure 2D:
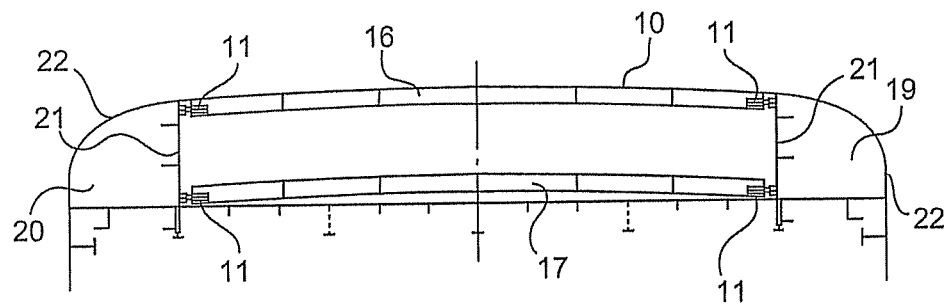
FIG. 2d is a cross section view of the forecastle in FIG. 2a along line A-A.

FIG. 2*d* shows a further cross-section through the forecastle, namely along line A-A in FIG. 2*a*.

The position of the panel 10 in the upper position 16 or in the alternative, lower position 17 is hereby apparent. Also apparent are the locks 11 at the sides of the panel 10.

It is also apparent from FIG. 2*d* that left and right of the panel 10 sidewalls 19 and 20 are formed. These sidewalls include on the one hand of an inner part 21 on which the locks 11 are fixed as well as an outer part 22 which is also already apparent in FIG. 1, namely where the wall portion of the forecastle transitions into the more horizontal plane (up to the rise to the bridge windows), so that the incoming wind can flow over the forecastle as much as possible without turbulence and reach the bridge or the sail rotors.

At the widest location of the panel 10, the sidewalls 19 and 20 are cut through and the opening 8—see FIG. 1—is visible from the outside.

One clearly recognizes that when the panel 10 is in the lower position 17 the water, which breaks over the forecastle at high seas and waves passes the panel 10 and strikes the bridge wall of the under structure 15 and can drain towards the left and right through the openings 8. The draining is thereby also assisted by the construction of the panel 10 which is not completely horizontal but slightly slopes down towards the left and right side as is well recognized from FIG. 2*d*.

At the same time, this construction of the panel 10 also has the advantage that the panel 10 when it is in its upper position 16 assists the onward sweep of the wind and thereby the optimal flow around the bridge.

Figure 2E:
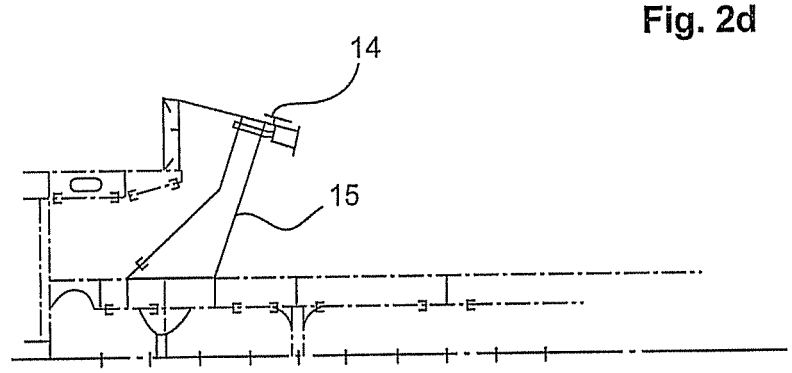
FIG. 2e is a cross section view of the locks of the forecastle as locking pins of FIG. 2c.
Figure 2F:
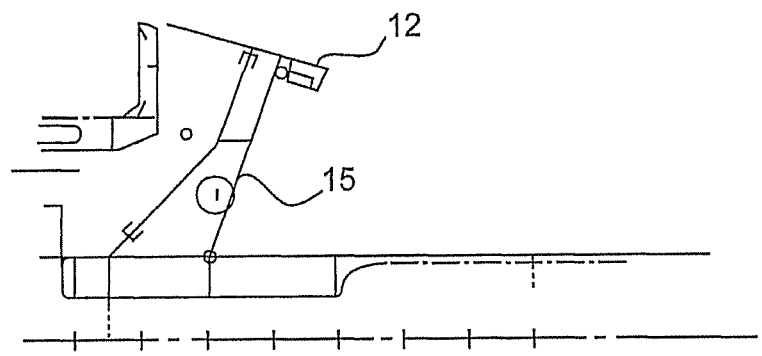
FIG. 2f is a cross section view of other locks of a forecastle.

FIG. 2*e* shows that construction of the locks 12 as locking pins.

Figure 2G:
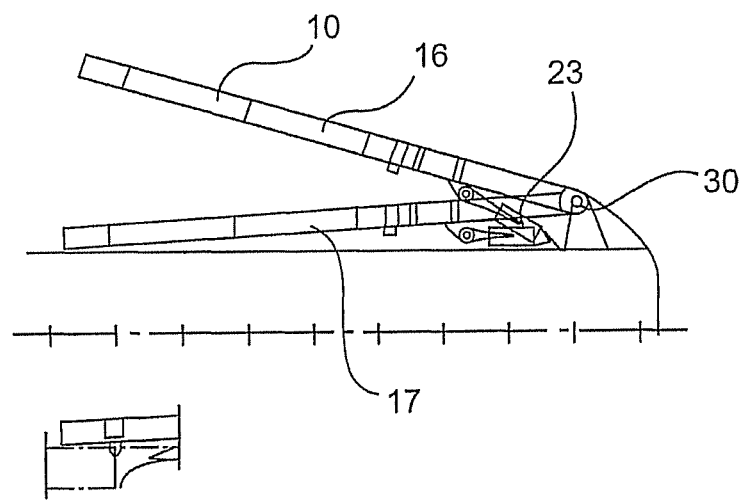
FIG. 2g is a cross section view of the panel 10 of the forecastle in the two different positions.
Figure 2H:
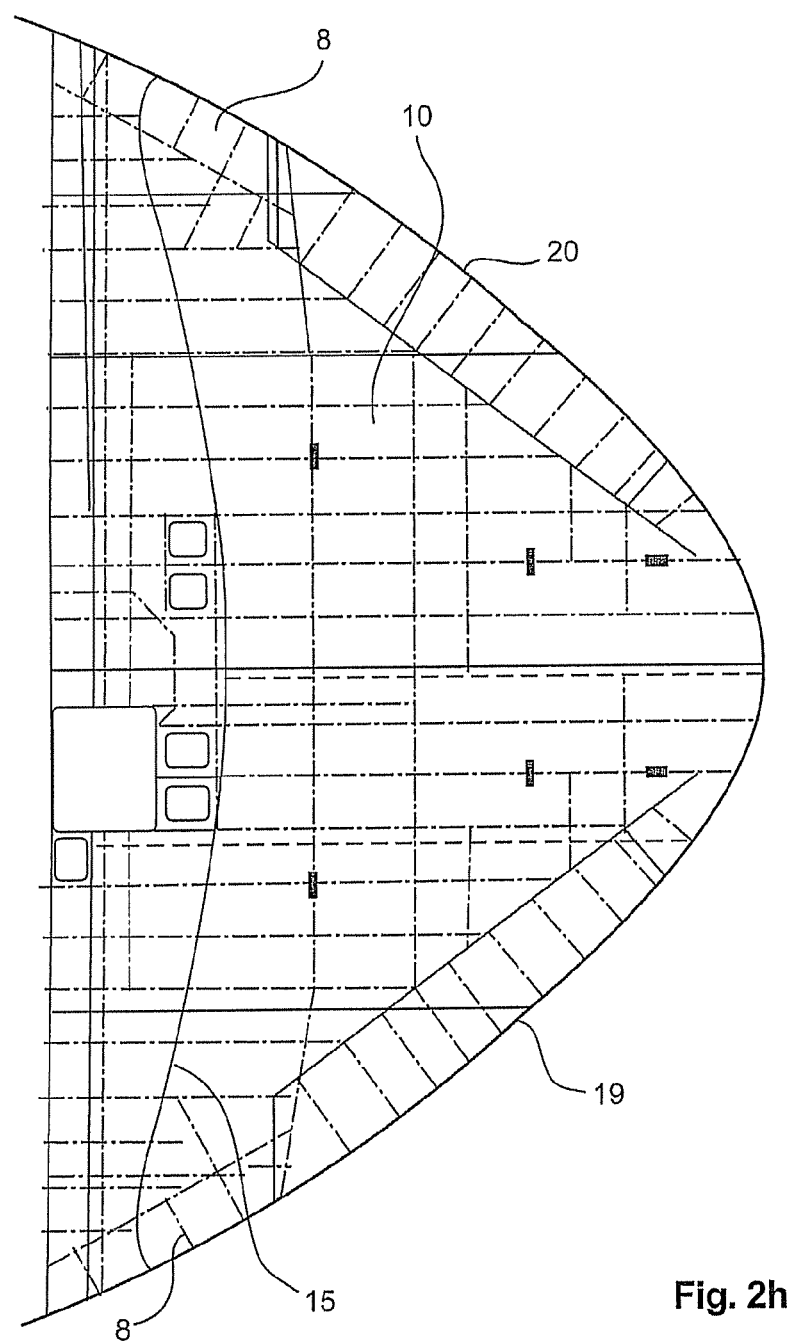
FIG. 2h is a top view of the upper deck of the ship of FIG. 1.

FIG. 2*g* once again shows the construction of the panel 10 in the two different positions "upper position" 16 and "lower position" 17 and FIG. 2*h* shows the complete view onto the upper deck of the forecastle with the panel 10, the course of the contour of the bridgewall 15, the sidewalls 19 and 20 as well as the openings 8. In the top view of FIG. 2*h* it is also apparent that the bridgewall does not extend in a straight line but as seen from the tip of the bow is located in the central region maximally close to the tip of the bow and then at the left and right side is slightly shifted to the back in order to guide the incoming water at the same time through the outside and in direction of the openings 8.

Figure 3:
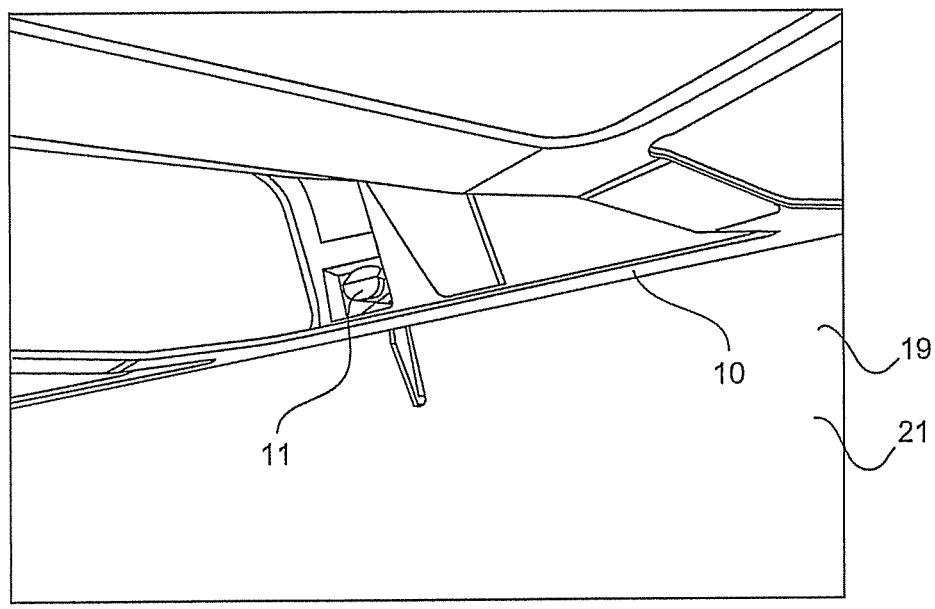
FIG. 3 is a bottom view of the forecastle in FIG. 1.

FIG. 3 shows a view from below onto the panel 10 (with stiffening/bracing) off the forecastle 3 and one lateral lock 11. The lateral lock 11 thereby includes a linearly moveable locking bolt, which is reciprocatable by a drive and which is formed at the inner wall 21 of the sidewall 19.

Figure 4:
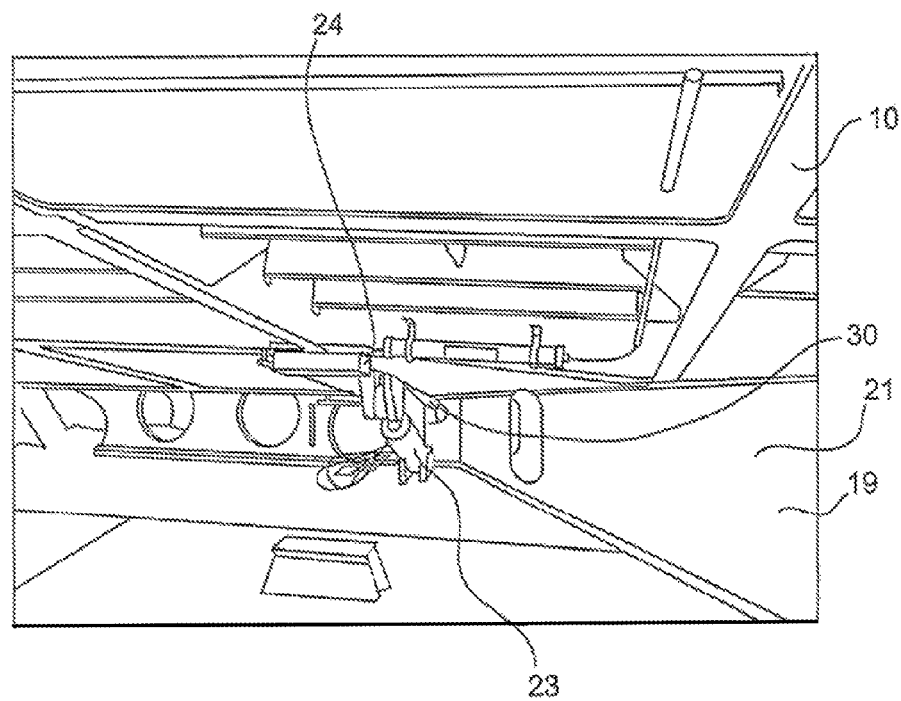
FIG. 4 is more detailed bottom view of the forecastle in FIG. 1.

FIG. 4 shows a view from below against the panel 10 with its bracings and also a hydraulic drive 23 as well as the inner wall 21 of the sidewall 19.

The rest 18 is apparent in the central region of FIG. 4 on which the panel 10 rests when it is in the lower position 17, whereby rubber buffers 24 are provided in order to avoid a hard impact of the panel 10. The drives 23 themselves are remotely controllable from the bridge and the same goes for the respective locks 11, 12.

The locks 11, 12 are opened before the movement of the panel 10 so that the panel 10 can be moved into the respectively desired position 16 or 17.

Figure 5:
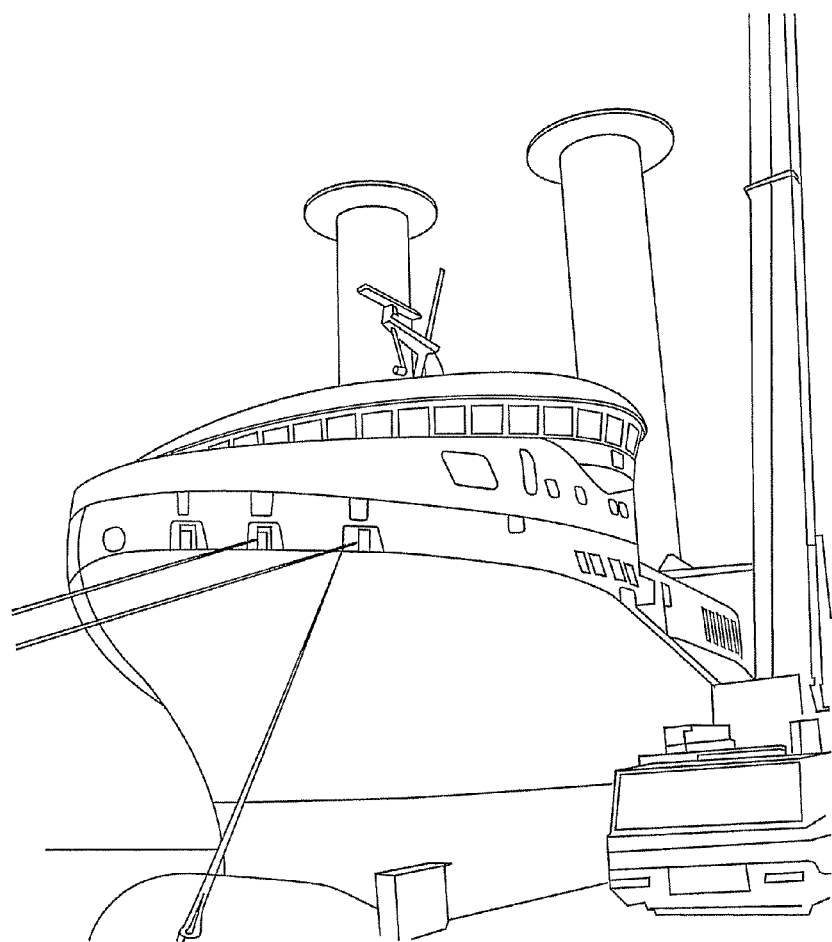
FIG. 5 is a front left isometric illustration of the ship in FIG. 1.
Figure 6:
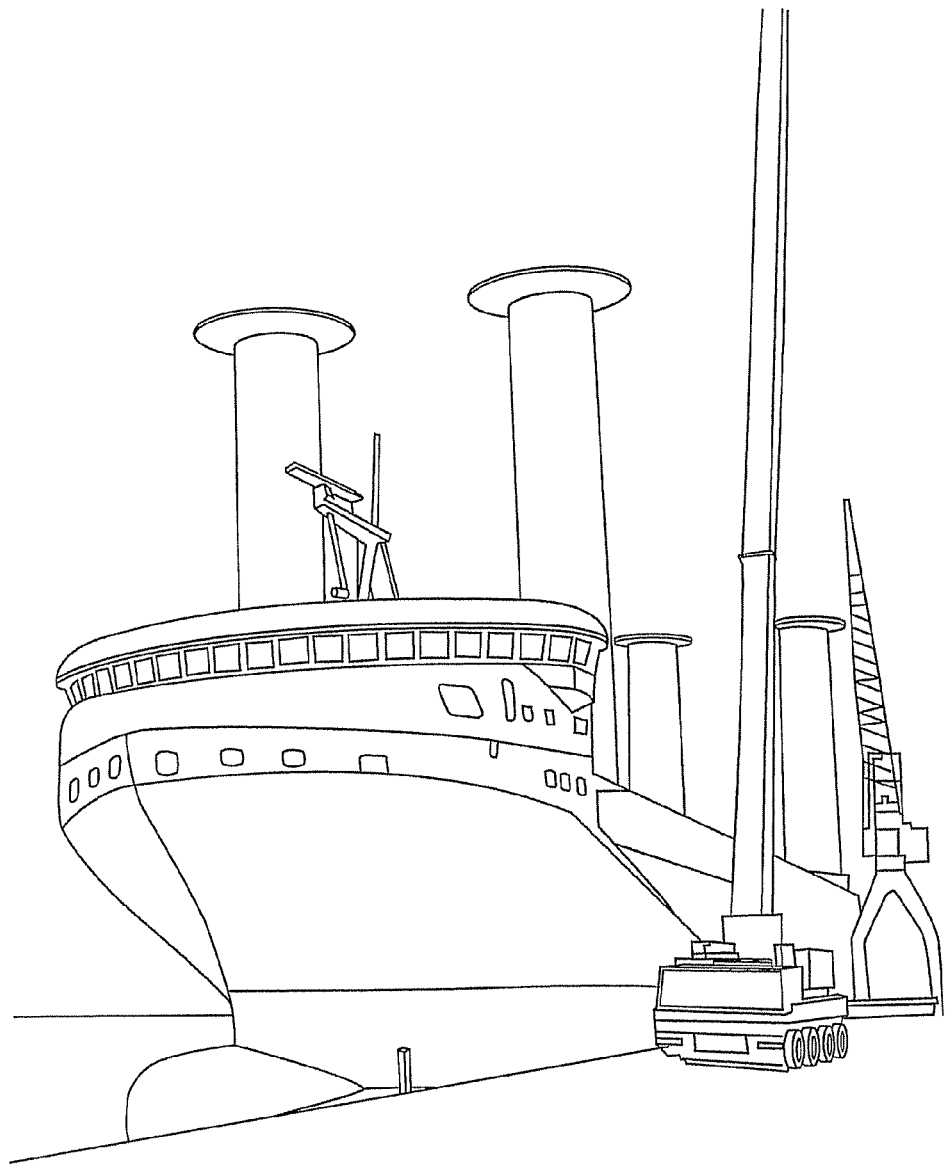
FIG. 6 is a front left isometric illustration of the ship in FIG. 1.

FIGS. 5 and 6 show further views of the ship in accordance with the invention or the forecastle of the ship.

As mentioned, the normal position of the panel 10 of the forecastle 3 is the one in the upper position 16.

When heavy seas develop, the panel 10 of the forecastle 3 can from the bridge be moved very fast into the lower position 17 so that waves which strike the forecastle cannot at all reach the region of the windows of the bridge, but strike the bridgewall 15 of the ship, are broken and then can drain towards the left and right through the openings 8.

The height of the panel 10 where it abuts in the upper position on the bridgewall 15 is about two meters above the floor, which is also apparent from FIG. 4. Consequently, waves or breakers which are so strong that they can reach the forecastle in the first place are very efficiently kept away from the bridge or its windows and therefore cannot endanger the bridge.

During normal seas, the waves are not driven this high over the forecastle and the panel 10 of the forecastle 3 is then held in the upper position 16 in order to thereby optimally assist the ship's advancement and the operation of the sail rotors.

By way of the soft outer contours also of the forecastle—here see especially FIGS. 1, 2*d* and 2*h*—not only the wind resistance of the ship is significantly lowered, but the wind air guidance over the sail rotors is also optimally shaped so that they experience the wind as much as possible without turbulence, which means in a substantially laminar manner.

FIG. 7 shows a further view of the ship in accordance with the invention in which the panel 10 of the forecastle 3 is emphasized by darker contrasting. It is again easily seen in the side view that the forecastle or the panel 10 softly rises up to the bridge 4 and its windows and that the panel 10 in its illustrated upper position 16 lies within the outer contours of the forecastle and thereby promotes a substantially swirl-free onflow of the wind to the bridge or to the Magnus rotors located therebehind.

The invention claimed is:

1. A ship comprising:
   at least one sail rotor; and
   a forecastle located at a bow of the ship, the forecastle having:
   sidewalls;
   locking mechanisms on the sidewalls; and
   a pivotable panel located between the sidewalls, wherein the panel is pivotable to a first position between the sidewalls and is locked into the first position by at least one of the locking mechanisms and a second position between the sidewalls and is locked into the second position by at least one of the locking mechanisms, when the panel is in the first position the panel breaks waves hitting the ship, when the panel is in the second position the panel guides substantially laminar wind to the at least one sail rotor.

2. The ship according claim 1, wherein the panel is pivotable relative to the horizontal.

3. The ship according to claim 1, wherein at least one of the sidewalls includes an opening configured to drain water.

4. The ship according to claim 1, further comprising a driving mechanism configured to move the panel between the first and second positions.

5. The ship according to claim 1, wherein the panel is configured to pivot between about 15° and 30°.

6. The ship according to claim 5, wherein the first position is separated from the second position by about 17° to 23°.

7. The ship according to claim 1, wherein the panel is triangular-shaped with a tip and a base, wherein the panel is configured to pivot about a joint at the tip.

8. The ship according to claim 1, further comprising an hydraulic assembly configured to cause the panel to pivot from the first position to the second position.

9. A method comprising:
   releasing a first locking mechanism that holds a panel in an upper position between sidewalls of a forecastle of a ship;
   rotating the panel from the upper position to a lower position between the sidewalls of the forecastle;
   engaging a second locking mechanism to hold the panel in the lower position between the sidewalls of the forecastle;
   receiving breaking waves on the forecastle, wherein the panel breaks the waves;
   releasing the second locking mechanism that holds the panel in the lower position between sidewalls of a forecastle;
   rotating the panel of the forecastle from the lower position to the upper position;
   engaging the first locking mechanism to hold the panel in the upper position between the sidewalls of the forecastle, wherein in the upper position the panel guides substantially laminar flow to at least one sail rotor on the ship; and
   draining water from the waves through an opening in at least one side of the forecastle.

10. The method of claim 9 wherein engaging the first and second locking mechanisms comprises using locking pins that engage with the panel.

11. The method of claim 9, wherein rotating the panel from the upper position to the lower position comprises rotating an end of the panel between about 15° and 30°.

12. A ship comprising:
    a plurality of sail rotors, the plurality of sail rotors being configured to partially propel the ship;
    a forecastle located at a bow of the ship, the forecastle having sidewalls and a triangular-shaped panel located between the sidewalls, the panel having a tip that faces the bow and a base that faces away from the bow, the tip of the panel being configured to pivot about a joint and to place the base of the panel in a first lower position and a second upper position, when the panel is located in a first lower position the panel is configured to break waves, and when the panel is located in a second upper position, the panel is configured to guide wind to the plurality of sail rotors, wherein the first lower position and the second upper position are between the sidewalls.

13. The ship according to claim 12, wherein the sidewalls of the forecastle include locking pins configured to engage with and lock the panel in the first and second positions.

14. The ship according to claim 12, wherein the sidewalls of the forecastle have at least one opening configured to drain water therethrough.

15. The ship according to claim 12, further comprising an hydraulic assembly configured to cause the panel to pivot from the first lower position to the second upper position.

* * * * *